United States Patent Office 2,789,383
Patented Apr. 23, 1957

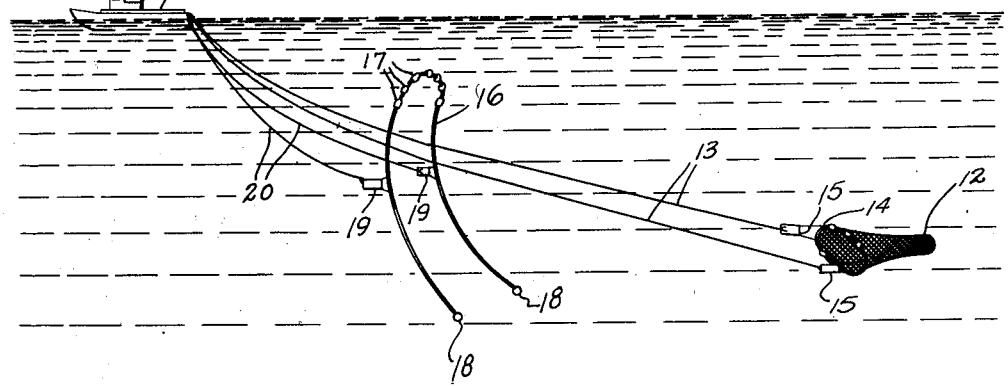
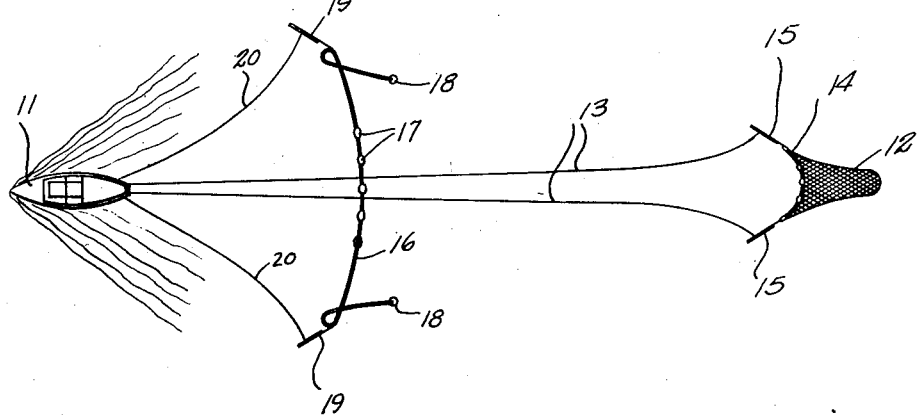
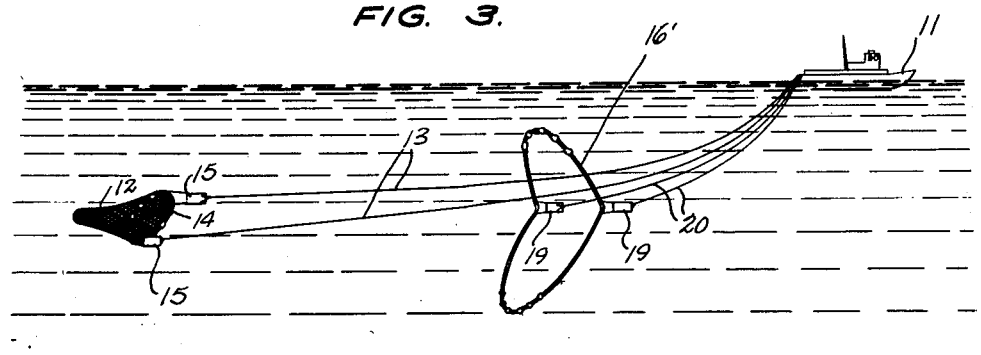

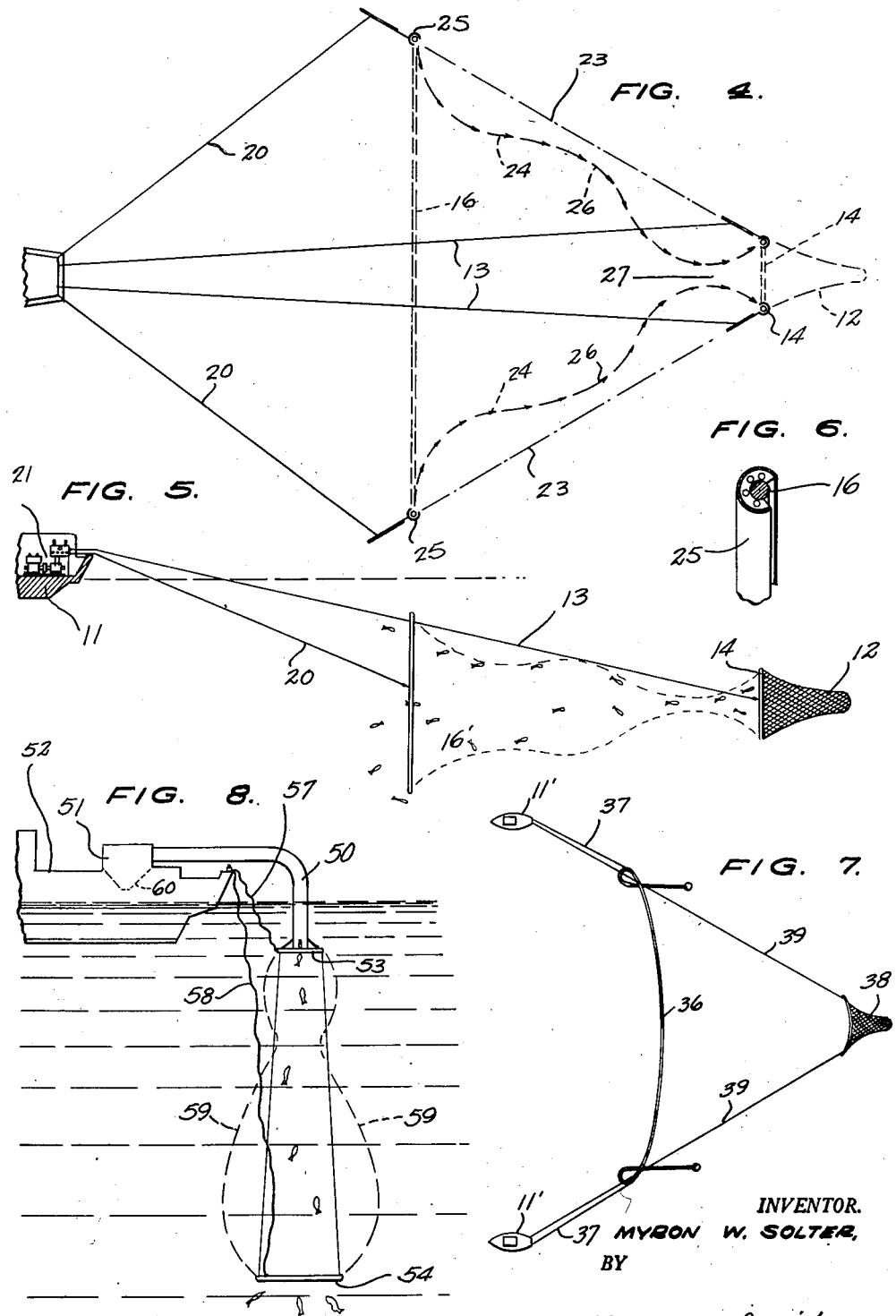

2,789,383
ELECTRIC TRAWLING SYSTEM
Myron W. Solter, Washington, D. C.
Application December 11, 1953, Serial No. 397,518
7 Claims. (Cl. 43—17.1)

This invention relates to the art of fishing, and more particularly to an improved electrical trawling system.

The main object of the invention is to provide a novel and improved system of electrical trawling in which fish may be electrically controlled and directed toward a net in an efficient and rapid manner.

A further object of the invention is to provide an improved electrical trawling system involving relatively simple apparatus, being easy to operate, allowing substantially greater trawling speeds than have been heretofore feasible, and being arranged to sweep an area many times greater than that covered by a conventional mechanical trawl, thereby considerably reducing the trawling time required for any given catch and thus considerably reducing production cost in connection with the trawling operation.

A further object of the invention is to provide an improved electrical trawling system which operates efficiently in catching all types of commercially important fish, either of the demersal type or of the pelagic type, and also being effective in catching shrimp and similar commercial seafood items.

A still further object of the invention is to provide an improved electrical trawling system which is economical to operate and which may be readily regulated to retain all fish above a predetermined size, permitting all fish under said predetermined size to escape.

A still further object of the invention is to provide an improved electrical trawling system employing a conical electrical field projecting forwardly from a net which is arranged so that fish entering the larger end of the conical electrical field are constrained to orient themselves with their heads toward the net and are stimulated to move toward the net by electrical pulses, the system being arranged so that fish entering the larger end of the conical electrical field feel no current or other electrical effects until they are within the larger end of the conical field but are thereafter constrained to orient themselves toward the net at the smaller end of the field and are stimulated to move toward the net.

Further objects and advantages of the invention will become apparent from the following description and claims, and from the accompanying drawings, wherein:

Figure 1 is a generally schematic cross sectional view taken vertically through the water and showing the major components of one form of electrical fishing system constructed in accordance with the present invention.

Figure 2 is a top plan view of the elements illustrated in Figure 1.

Figure 3 is a vertical cross sectional view, similar to Figure 1, and showing another form of apparatus employed in carrying out the improved electrical trawling method of the present invention.

Figure 4 is an enlarged horizontal cross sectional view showing schematically the horizontal configuration of the electric field developed by the apparatus of Figures 1 to 3 and showing the configuration of the electrical potential gradient along the sides of the electrical field.

Figure 5 is a vertical cross sectional view showing the apparatus of Figure 3 and illustrating the manner in which fish caught within the electric field are oriented within the field and guided toward the net at the smaller end of the field.

Figure 6 is a fragmentary enlarged perspective view showing one manner in which the electrodes may be shielded to reduce fringe effects ahead of the electrodes and to beam the field as tightly as possible between the electrodes.

Figure 7 is a top plan view illustrating a still further modified form of apparatus which may be employed to carry out the improved method of the present invention.

Figure 8 is a fragmentary side elevational view showing a further modification of apparatus which may be employed to perform an electrical fishing operation in accordance with the method of the present invention.

Referring to the drawings, and more particularly to Figures 1 and 2, 11 designates a trawler and 12 designates a net which is attached to the trawler 11 by means of marine cables 13, said cables comprising conductors which are insulated and covered by suitable material having high corrosion resistance, such as nylon or the like. The net 12 includes the flexible metal rim 14, and the cables 13 are electrically connected to diametrically opposite points on the metal rim 14 through the forwardly divergent otter boards 15, 15 which orient the net 12 in the manner illustrated in Figures 1 and 2 responsive to the forward motion of the trawler 11. Designated at 16 is an electrode member which is generally of inverted U-shape, as shown in Figures 1 and 2, said electrode member being provided at its top portion with the spaced floats 17 and at its lower ends with the weights 18, 18. The intermediate portions of the side arms of the conductive electrode 16 are electrically connected through the otter boards 19, 19 to marine cables 20, similar to the cables 13, extending rearwardly from the trawler 11. Thus, the electrode 16 assumes the configuration shown in Figures 1 and 2 responsive to the forward movement of the trawler 11, the electrode 16 being thus supported between the trawler 11 and the net 12 at a considerable distance forwardly of the net and extends over a considerably greater area than the mouth of the net, as is clearly shown in Figure 2.

Mounted on the rear portion of the trawler 11 is an electrical pulse generator 21, for example, a pulse generator such as is described in U. S. Patent No. 2,745,205, issued May 15, 1956, to W. Kafka, or in British Patent 699,346 to C. Kreutzer, which is driven by a suitable prime mover and which is arranged to periodically generate direct current pulses at a relatively rapidly recurrent rate which may be of an order of frequency approximating the natural wriggling frequency of the fish being sought. As will be subsequently explained, the pulse frequency may, under certain circumstances, be higher than the natural wriggling frequency of the smallest fish sought, and alternatively, under other conditions, the pulse frequency may be substantially lower than said natural wriggling frequency.

The cables 13 are connected to one of the output terminals of a generator 21 and the cables 20 are connected to the other of the output terminals of said generator. Preferably, the cables 13 are connected to the positive terminal of the generator, whereby the electrode ring 14 becomes an anode, the cables 20 being connected to the negative terminal of the generator, whereby the electrode 16 becomes a cathode, with respect to the electric field resulting from the aforesaid circuit connections. With the circuit connections, the electric field is rearwardly convergent, namely, convergent from the electrode 16 toward the net 12, the side axes of the electric field being diagrammatically shown at 23, 23 in Figure 4, and the respective configurations of the potential gradients along the sides of the surface defined between said electrode 16 and the electrode 14 being respectively shown by the dumbbell-shaped curves 24, 24 in Figure 4. See, for example, U. S. Patent No. 2,745,205, to W. Kafka, illustrating the manner in which an electric field is distributed between a pair of spaced electrodes in sea water. Also see British Patent 699,346 to C. Kreutzer, also illustrating the manner in which field distribution occurs between a pair of spaced electrodes in sea water.

In operation of the apparatus, as the trawler moves forwardly, the forward electrode 16 is maintained in a widely spread apart condition by the orienting action of the forwardly divergent otter boards 19, 19. There is thus produced a forwardly diverging electric field which converges rearwardly from the electrode 16 toward the net 12 along an imaginary surface extending between said electrode and the rim of the net. When fish enter the larger forward end of the electric field, the fish are constrained to turn toward the net 12 and are moved into the net as the trawler moves forwardly. This occurs because of the established facts that (1) fish can be repelled by the field created when an electric current is passed through water; and (2) the phenomenon of electrotaxis, wherein a fish placed in an electric field will, at a specific voltage, orient itself with its head toward the anode electrode of the field. In the method of the present invention, the electric field is essentially along an imaginary surface comprising a forward extension of the generally conical region defined by the net 12, said forward extension constituting a barrier of electrical energy instead of netting.

The forward electrode, namely, the cathode member 16, is towed as close to the trawler as practical and is maintained in its desired configuration by the forwardly divergent otter boards 19, 19 secured to the intermediate portions of its side arms, by the floats 17 carried by its top portion and by the weights 18, 18 carried by its lower ends.

As shown in Figures 4 and 6, suitable shield channels 25 may be provided on the respective electrode elements to eliminate undesired fringe effects and to beam the electric field as tightly as possible between the electrodes. Thus, each shield channel comprises a conductive sheath or channel mounted on and insulated from its associated electrode, the sheath or channel being open in a direction facing the opposite electrode, to beam the electric field toward said opposite electrode. For example, the shield element 25 on the forward electrode 16 tends to prevent the extension of the fringes of the field in front of the forward electrode and to direct the field inwardly and rearwardly to provide the potential gradient configurations 24 illustrated in Figure 4.

From Figure 4 it will be apparent that as the apparatus moves through the water, all fish in the area swept by the forward electrode 16 are taken in, the fish feeling no current or other electrical effects until they are already within the forward electrode, except for a relatively small proportion of the fish which closely approach the side arms of the electrode, of which approximately half will flee toward the interior of the field and the other half will escape. As the trawler moves forwardly, and as the fish move toward the smaller end of the convergent field all fish large enough to be electrically influenced by the field are constrained inwardly toward the center line of the field, in alignment with the approaching net which eventually overtakes them. The fish cannot escape through the sides of the convergent field, since the field is at maximum intensity along said sides, whereby the fish will tend to crowd in toward the mid portion of the field where the electrical potential gradient is relatively small. Any attempts to escape forwardly from the field are minimized because the apparatus is being moved forwardly by the trawler and also by the unsymmetrical position of the electrodes in relation to each other which distorts the field to create a baffle effect. For example, the field is relatively reduced at the intermediate portions of the dumbbell-shaped curves, as at 26, 26 wherein the potential gradient becomes smaller than toward the front or rear of the field. Escape of fish is also minimized by the fact that in certain parts of the field, namely, near the sides thereof, the fish are constrained to orient their heads toward the rear electrode 14. The field is so shaped by the angle of the electrodes and the distance between them so that it narrows at its smaller end substantially to the same area swept mechanically by the net 12, namely, to define a channel 27 shown in Figure 4, leading directly into the net. In the area of the channel 27, the voltage gradient is sufficiently high to stun (electronarcotize) or kill the larger fish so that they will not damage the net.

In the form of the apparatus shown in Figure 3, the forward electrode, designated at 16', is in the form of a closed loop which is connected at its side portions through the forwardly divergent otter boards 19, 19 to the marine cables 20. The marine cables 13 extend through the loop 16' and are connected through the otter boards 15, 15 to the ring electrode 14 comprising the rim of the net 12. With the apparatus of Figure 3, a forwardly divergent generally conical electric field is created between the electrodes 16' and 14, said conical field constituting a forward extension of the net 12, as above described, in connection with the apparatus illustrated in Figures 1 and 2. The considerations of Figure 4 apply in the same manner to Figure 3 as to the apparatus illustrated in Figures 1 and 2. However, the apparatus of Figures 1 and 2 is specifically suitable for bottom trawling, whereas the apparatus of Figure 3 is specifically adapted for use in trawling at an intermediate depth. In the apparatus of Figures 1 and 2, the forward electrode 16 has its ends 18, 18 dragging lightly on the bottom, the net 12 being towed in a somewhat higher position than in conventional trawling and being out of contact with the bottom. This arrangement prevents damage to the net and permits greater trawling speeds.

Referring now to the arrangement illustrated in Figure 7, two boats 11', 11' may be employed, the forward electrode, shown at 36, being connected by the respective marine cables 37, 37 to the trawlers 11', 11' and being thus supported in a spreadout configuration without requiring the use of otter boards. The net, shown at 38, is connected to the trawlers 11', 11' by the marine cables 39, 39 and is thus supported in a position defining the smaller end of a forwardly divergent electric field which is produced by connecting the terminals of a suitable electric generator mounted on either of the trawlers to the marine cables 37 and 39, respectively. Obviously, respective voltage generators may be provided on each of the trawlers 11', 11' and connected to the electrodes with their output voltages in phase, so as to produce the desired electric field, corresponding to the field produced by the arrangement illustrated in Figures 1 to 5.

Referring now to the form of the apparatus illustrated in Figure 8, 50 designates a large suction conduit connected to a suction pump 51 provided on the trawler, shown at 52, the conduit 50 terminating in the intake nozzle 53 located behind the trawler and facing downwardly into the water, the nozzle being immersed in the water to a substantial depth. Supported below the nozzle 23 by any suitable means, such as suitable cables is the large ring electrode 54 having a diameter considerably greater than the diameter of the nozzle 53. The ring electrode 54 is supported at a substantial depth below the nozzle 53 and thus defines an upwardly convergent cone terminating at nozzle 53. The nozzle 53 is connected by a marine cable 57 to one terminal of an electric pulse generator mounted on the rear portion of the trawler 52 and the ring electrode 54 is connected by another marine cable 58 to the other terminal of the pulse generator, the ring electrode 54 being preferably connected to the negative terminal of the generator, whereby said ring electrode is cathodic and the nozzle 53 is anodic, with respect to each other. The resultant electric field between nozzle 53 and electrode 54 comprises a downwardly flaring cone wherein the potential gradient distribution may be represented by curves similar to those shown at 59, 59 in Figure 8. Within this field, fish are oriented toward the nozzle 53 and are drawn upwardly toward said nozzle both by their own movements and by the suction produced by the pump 51 whereby the fish are drawn into the conduit 50 and are deposited in a suitable net 60 provided in the pump 51. As in the previously described embodiments of the system of the present invention, the fish are oriented toward the anodic electrode 53 and are constrained to move toward the nozzle as they approach the smaller end of the conical electric field established between said nozzle and the ring electrode 54.

In view of the necessity of maintaining the requisite voltage gradient across a thousand feet or more of sea water, which has a high conductivity, and of keeping the power supply unit relatively small, a gasoline motor-driven generator supplying a high power pulser, such as is described in the above mentioned U. S. Patent No. 2,745,205 to W. Kafka, or the British Patent No. 699,346 to C. Kreutzer, is employed as a preferred power unit.

The voltage at the electrode is so regulated that the mean turn-back voltage gradient for the type and size of fish sought describes the dumbbell-shaped curves, such as 24, 24 in Figure 4, around the respective side axes 23, 23 at any given section of the field. It will be understood that the "side axes" 23, 23, shown in Figure 4 represent the intersections of a horizontal plane with an imaginary, generally conical surface containing the straight lines connecting all the respective opposing points on the opposing electrodes 16 and 14. Using the repulsion principle alone, and employing a pulse frequency higher than the natural wriggling frequency of the smallest fish sought, the field may be reversed in polarity without substantially affecting the efficiency of the apparatus. However, maximum efficiency is obtained when the after electrode, namely, the electrode 14 in Figures 1 to 5 and the electrode 53 in Figure 8 is polarized so as to be the anode, with a lower pulse frequency, thus combining the repulsion effect with the orientation effect (electrotaxis).

In setting out the apparatus shown in Figures 1 to 7, the net is set out first, followed by the forward electrode. The apparatus is taken in in the reverse order to that above described. The net is hauled in and landed in the conventional manner.

The power supply unit is installed in the engine room of the trawler or in any other place secure from spray or sea water.

Suitable insulation is provided for those portions of the circuit located on the boat, and if the boat is steel-hulled, the boat is kept well ahead of the electric field to eliminate and reduce stray field effects. Emergency cutoff switches are provided in the wheel house and on other suitable locations on the boat to prevent electrocution of any crew member falling overboard.

It will be apparent that since the area swept by the electric field is of the order of ten to twenty times greater than that of the conventional mechanical trawl, this will reduce correspondingly the trawling time required for any given catch. Thus, production costs in commercial fishing, employing the invention, will be reduced considerably. The system will operate effectively in catching all types of commercially important demersal fish and many types of pelagic fish, particularly when swimming at intermediate depths. With suitable modifications, the system will be effective in catching shrimp nad similar seafood items.

Since the degree to which a fish is affected by an electric field in water is determined by the ratio of the voltage gradient to its size, the voltage may be readily regulated to retain all fish above the desired size, permitting all fish under that size to escape.

The present system, providing a forward projection of the net, overcomes one of the greatest defects heretofore present in electric fishing devices employing the electrotaxis principle alone, namely, that although a fish seized in the field when the circuit is closed may be constrained to orient itself with its head toward the anode and stimulated to move to the anode by pulses, fish outside the field after the circuit is closed will usually refuse to penetrate the field far enough to be affected by electrotaxis that is, when the fish feels the first twinges of current, it flees. In the present system, the fish feels no current until it is already within the forward electrode, except for the small proportion that are approached closely by the electrode, of which about half will flee toward the center of the field and be eventually captured.

The system and apparatus above described can be used with equal effectiveness in both salt and fresh water, and is suitable for use with all forms of motile marine life.

While certain specific embodiments of an improved system of electrical fishing and apparatus for carrying out the improved system have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing apparatus comprising a net, means for attaching said net behind a trawler, a first electrode, means for connecting said electrode to the trawler in a position spaced rearwardly therefrom and extending transversely over and including a substantially greater transverse area than the mouth of the net, means for supporting said first electrode in a spread-out position between the trawler and the net responsive to forward movement of the trawler and for moving the electrode forwardly with the net, a second electrode mounted on and extending completely around the mouth of the net, and a voltage source having its terminals connected respectively to said electrodes, said electrodes being formed and arranged to form a channel of relatively low potential gradient forwardly of and leading into said net.

2. A fishing apparatus comprising a net, means for attaching said net behind a trawler, a cathode element, means for connecting said cathode element to the trawler in a position spaced rearwardly therefrom and extending transversely over and including a substantially greater transverse area than the mouth of the net, means for supporting said cathode element in a spread-out position between the trawler and the net and for moving the cathode element forwardly with the net, an anode element mounted on and extending completely around the mouth of the net, and a voltage source having its negative and positive terminals connected respectively to said cathode and anode elements, said cathode and anode elements being formed and arranged to form a channel of relatively low potential gradient forwardly of and leading into said net.

3. A fishing apparatus comprising a net, means for attaching said net behind a trawler, a first electrode, means for connecting said electrode to the trawler in a position spaced rearwardly therefrom and extending transversely over and including a substantially greater transverse area than the mouth of the net, means for supporting said first electrode in a spread-out position between the trawler and the net responsive to forward movement of the trawler and for moving the electrode forwardly with the net, a second electrode mounted on and extending completely around the mouth of the net, and a pulse generator having its terminals connected respectively to said electrodes, said electrodes being formed and arranged to form a channel of relatively low potential gradient forwardly of and leading into said net.

4. A fishing apparatus comprising a net, means for attaching said net behind a trawler, an inverted U-shaped electrode extending transversely over and including a substantially greater transverse area than the mouth of the net, means for supporting said U-shaped electrode in a spread-out position spaced rearwardly from the trawler between the trawler and the net responsive to forward movement of the trawler and for moving the electrode forwardly with the net, a second electrode mounted on and extending completely around the mouth of the net, and a voltage source having its terminals connected respectively to said electrodes, said electrodes being formed and arranged to form a channel of relatively low potential gradient forwardly of and leading into said net.

5. A fishing apparatus comprising a net, means for attaching said net behind a trawler, a first electrode in the form of a closed loop extending around and including a substantially greater transverse area than the mouth of the net, means for supporting said first electrode in a spread-out position spaced rearwardly from the trawler between the trawler and the net responsive to forward movement of the trawler and for moving the electrode forwardly with the net, a second electrode mounted on and extending completely around the mouth of the net, and a voltage source having its terminals connected respectively to said electrodes, said electrodes being formed and arranged to form a channel of relatively low potential gradient forwardly of and leading into said net.

6. A fishing apparatus comprising a net, means for attaching said net behind a trawler, an inverted U-shaped cathode element extending transversely over and including a substantially greater transverse area than the mouth of the net, means for supporting said cathode element in a spread-out position spaced rearwardly from the trawler between the trawler and net responsive to forward movement of the trawler and for moving the cathode element forwardly with the net, an anode element mounted on and extending completely around the mouth of the net, and a voltage source having its negative and positive terminals connected respectively to said cathode and anode elements, said cathode and anode elements being formed and arranged to form a channel of relatively low potential gradient forwardly of and leading into the mouth of the net.

7. A fishing apparatus comprising a net, means for attaching said net behind a trawler, a cathode element in the form of a closed loop extending around and including a substantially greater transverse area than the mouth of the net, means for supporting said cathode element in a spread-out position between the trawler and the net responsive to forward movement of the trawler and for moving the cathode element forwardly with the net, an anode element mounted on and extending completely around the mouth of the net, and a voltage source having its negative and positive terminals connected respectively to said cathode and anode elements, said cathode and anode elements being formed and arranged to form a channel of relatively low potential gradient forwardly of and leading into the net.

References Cited in the file of this patent

UNITED STATES PATENTS

| 2,163,282 | Hovden | June 20, 1939 |
| 2,238,897 | Gomez | Apr. 22, 1941 |
| 2,745,205 | Kafka | May 15, 1956 |

FOREIGN PATENTS

| 176,096 | Great Britain | Feb. 27, 1922 |
| 496,864 | Belgium | July 31, 1950 |
| 693,229 | Great Britain | June 24, 1953 |
| 699,346 | Great Britain | Nov. 4, 1953 |
| 833,429 | Germany | Mar. 6, 1956 |

OTHER REFERENCES

Popular Mechanics, February 1952 issue. Page 96.